US012811173B2

(12) United States Patent
Woo et al.

(10) Patent No.: US 12,811,173 B2
(45) Date of Patent: Nov. 24, 2026

(54) GRIPPER AND SECONDARY BATTERY TRANSFER DEVICE INCLUDING THE SAME

(71) Applicant: LG Energy Solution, Ltd., Seoul (KR)

(72) Inventors: Chang Ha Woo, Daejeon (KR); Jeong Gyu Baek, Daejeon (KR); Chang Min Ji, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 570 days.

(21) Appl. No.: 18/289,489

(22) PCT Filed: Sep. 27, 2022

(86) PCT No.: PCT/KR2022/014477
§ 371 (c)(1),
(2) Date: Nov. 3, 2023

(87) PCT Pub. No.: WO2023/090624
PCT Pub. Date: May 25, 2023

(65) Prior Publication Data

US 2024/0234782 A1 Jul. 11, 2024

(30) Foreign Application Priority Data

Nov. 18, 2021 (KR) ........................ 10-2021-0159688

(51) Int. Cl.
*H01M 10/04* (2006.01)
*H01M 50/105* (2021.01)
*H01M 50/178* (2021.01)

(52) U.S. Cl.
CPC ..... *H01M 10/0404* (2013.01); *H01M 50/105* (2021.01); *H01M 50/178* (2021.01)

(58) Field of Classification Search
CPC ........... H01M 10/0404; H01M 50/178; H01M 50/105
See application file for complete search history.

(56) References Cited

U.S. PATENT DOCUMENTS

| | | | |
|---|---|---|---|
| 2019/0207183 | A1 | 7/2019 | Park et al. |
| 2020/0365868 | A1 | 11/2020 | Son et al. |
| 2021/0036302 | A1 | 2/2021 | Kim et al. |

FOREIGN PATENT DOCUMENTS

| | | | |
|---|---|---|---|
| CN | 207269044 | U | 4/2018 |
| CN | 109478674 | A | 3/2019 |
| CN | 209256970 | U | 8/2019 |
| KR | 20140133140 | A | 11/2014 |

(Continued)

OTHER PUBLICATIONS

International Search Report for PCT/KR2022/014477 mailed Jan. 2, 2023. 3 pages.

(Continued)

*Primary Examiner* — Jane J Rhee
(74) *Attorney, Agent, or Firm* — Lerner David LLP

(57) ABSTRACT

A secondary battery transfer device includes a gripper that transfers a secondary battery. The gripper securely grasps the secondary battery including a pouch, which includes an accommodation part in which an electrode assembly is accommodated, a gas pocket part extending from the accommodation part, and an electrode lead protruding from the pouch. The gripper includes at least one electrode lead fixing part that grasps and holds the electrode lead, and at least one gas pocket fixing part that grasps and holds the gas pocket part.

11 Claims, 4 Drawing Sheets

(56) References Cited

FOREIGN PATENT DOCUMENTS

| | | | |
|---|---|---|---|
| KR | 101486232 | B1 | 1/2015 |
| KR | 20170103332 | A | 9/2017 |
| KR | 101830350 | B1 | 2/2018 |
| KR | 101873709 | B1 | 7/2018 |
| KR | 101896218 | B1 | 9/2018 |
| KR | 101932444 | B1 | 12/2018 |
| KR | 20200017825 | A | 2/2020 |
| KR | 102103877 | B1 | 4/2020 |
| KR | 20210003532 | A | 1/2021 |
| KR | 102254203 | B1 | 5/2021 |
| KR | 20210097301 | A | 8/2021 |

OTHER PUBLICATIONS

Search Report dated Jun. 18, 2026 from the Office Action for Chinese Application No. 202280030406.7 issued Jun. 26, 2026, 2 pages.

PRIOR ART

GRIPPER AND SECONDARY BATTERY TRANSFER DEVICE INCLUDING THE SAME

CROSS-REFERENCE TO RELATED APPLICATION

The present application is a national phase entry under 35 U.S.C. § 371 of International Application No. PCT/KR2022/014477 filed on Sep. 27, 2022, which claims the benefit of the priority of Korean Patent Application No. 10-2021-0159688, filed on Nov. 18, 2021, all of which is hereby incorporated herein by reference in its entirety.

TECHNICAL FIELD

The present disclosure relates to a gripper and a secondary battery transfer device including the same, and more particularly, to a gripper that transfers a secondary battery, and a secondary battery transfer device including the gripper.

BACKGROUND ART

Recently, as information technology (IT) is remarkably developed, the use of various portable information and communication devices has been proliferated and accordingly, the 21st century society evolves into a "ubiquitous society" in which high-quality information service is available regardless of time and place.

Lithium secondary batteries play an important role in the evolution into such a ubiquitous society. Specifically, chargeable and dischargeable lithium secondary batteries are not only widely used as energy sources for wireless mobile devices, but also used as energy sources for electric vehicles, hybrid electric vehicles, and so on, which have been proposed to solve problems such as air pollution caused by existing gasoline and diesel vehicles using fossil fuel.

As devices to which the lithium secondary batteries are applied are diversified as described above, the lithium secondary batteries are diversified so as to provide powers and capacities suitable for the devices. In addition, there is a strong need to reduce the size and weight of the lithium secondary batteries.

According to the shape of a battery, the lithium secondary batteries may be classified into cylindrical type secondary batteries, prismatic type secondary batteries, pouch type secondary batteries, and so on. Among these batteries, the pouch type secondary batteries, which can be stacked with high integration, has a high energy density per weight, and is inexpensive and easy change in shape, attract a lot of interest.

Here, as illustrated in FIG. 1, a pouch type secondary battery 10 has a structure in which an electrode assembly 11 constituted by a positive electrode, a negative electrode, and a separate disposed therebetween is embedded with an electrolyte in a pouch 12 having an empty space defined therein, and an outer circumference of a battery case is sealed, and an electrode lead 13 electrically connected to the electrode assembly 11 protrudes from the pouch 12.

The pouch 12 may have a structure in which an inner resin layer made of a synthetic resin material, an ultra-thin metal layer made of a metal material, and an outer resin layer made of a synthetic resin material are stacked from the inside toward the outside. The pouch 12 may include an accommodation part 12*a* in which the electrode assembly 11 and the electrolyte are accommodated, and a gas pocket part 12*b* which extends from the accommodation part 12*a* and in which gas generated from the electrode assembly 11 is collected.

Such a secondary battery 10 is transferred between process stages during a secondary battery manufacturing process. Here, a secondary battery transfer device including a gripper that presses and fixes the secondary battery 10 is used as one of units that transfer the secondary battery 10.

The gripper may press and fix the secondary battery 10, and then move in a vertical direction or in a horizontal direction so as to transfer the secondary battery 10 between the process stages. In more detail, the gripper presses and fixes at least an area of the secondary battery 10 in a state, in which the secondary battery 10 is accommodated to stand vertically so that the gas pocket part 12*b* is disposed above the accommodation part 12*a*, and then moves in the vertical direction or in the horizontal direction so as to perform the transfer of the secondary battery 10.

However, there is a problem that the gas pocket part 12*b* is biased toward the front or rear of the pouch during the accommodating or transferring of the secondary battery 10. In this case, when the gripper moves towards the secondary battery 10, there are problems that the gas pocket part 12*b* interferes with the gripper to cause scratch on an outer appearance of the secondary battery 10 or to make it difficult for the gripper to grip the secondary battery, so that secondary battery quality is deteriorated and process efficiency is reduced. Thus, technologies for fundamentally solving the above problems are required.

DISCLOSURE OF THE INVENTION

Technical Problem

The embodiments of the present invention have been made to solve the above problems, and an object of the present disclosure is to provide a gripper with which a position of a gas pocket part is fixed, and a secondary battery transfer device including the gripper.

Technical Solution

The present disclosure provides a gripper that presses and fixes a secondary battery including a pouch, which includes an accommodation part in which an electrode assembly is accommodated and a gas pocket part extending from the accommodation part, and an electrode lead protruding from the pouch. The gripper is characterized by including at least one electrode lead fixing part that presses and fixes the electrode lead, and at least one gas pocket part fixing part that presses and fixes the gas pocket part.

The electrode lead fixing part may be provided in a pair and movably provided to adjust a spaced distance between the pair of electrode lead fixing parts.

The gas pocket part fixing part may be provided in a pair and movably provided to adjust a spaced distance between the pair of electrode lead fixing parts.

The gas pocket part fixing part may include a connection part connected to the electrode lead fixing part, and a protrusion protruding from the connection part so as to face one surface of the gas pocket part.

The protrusion may protrude perpendicularly from the connection part.

The protrusion may include a pressing part that is provided to face the gas pocket part so as to press the gas pocket part, and an inclined part extending from the pressing part.

The inclined part may be inclined in a direction that is away from the gas pocket part, as being far away from the pressing part.

The inclined part may be disposed at a lower portion of the pressing part and inclined toward a lower side in a direction that is away from the gas pocket part.

The gas pocket part fixing part may further include a pad part provided in an area facing the gas pocket part to improve adhesion with the gas pocket part.

The pad part may be made of silicon.

The gas pocket part fixing part may further include a pad part provided between the pressing part and the gas pocket part to improve adhesion with the gas pocket part.

The present disclosure provides a secondary battery transfer device that transfers a secondary battery including a pouch, which includes an accommodation part in which an electrode assembly is accommodated and a gas pocket part extending from the accommodation part, and an electrode lead protruding from the pouch. The secondary battery transfer device is characterized by including a body part and a pair of grippers that are movably connected to the body part and press and fix the secondary battery, wherein each of the grippers includes at least one electrode lead fixing part that presses and fixes the electrode lead, and at least one gas pocket part fixing part that presses and fixes the gas pocket part.

Advantageous Effects

The present disclosure provides the advantage that the gas pocket part fixing part may be used to fix the position of the gas pocket part so that the gripper may smoothly press and fix the secondary battery.

The present disclosure provides the advantage that the gas pocket part fixing part may be used to fix the position of the gas pocket part so as to minimize the damage that may be caused by the gripper on the outer appearance of the secondary battery.

DETAILED DESCRIPTION

Figure 1:
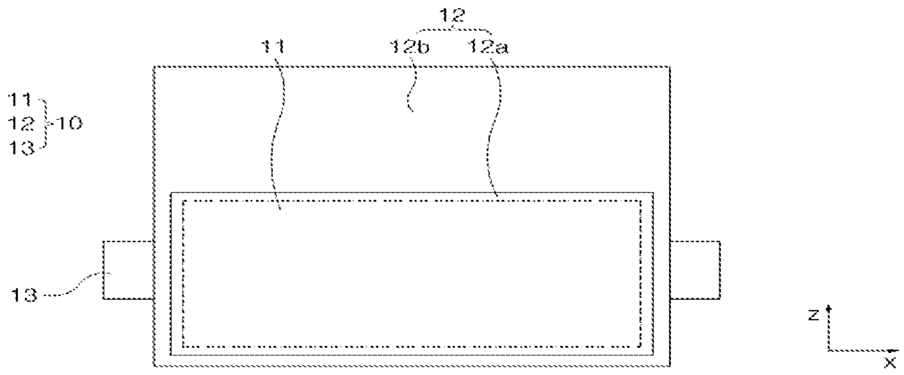
FIG. 1 is a front view illustrating a secondary battery when viewed from a front side.

Hereinafter, preferred embodiments of the present invention will be described in detail with reference to the accompanying drawings so as to enable those skilled in the art to which the present disclosure pertains to easily carry out the present invention. The present invention may, however, be embodied in different forms and should not be construed as limited by the embodiments set forth herein.

The parts unrelated to the description, or the detailed descriptions of related well-known art that may unnecessarily obscure subject matters of the present invention, will be ruled out in order to clearly describe the present invention. In the drawings, like reference numerals refer to like elements throughout the whole specification.

Moreover, terms or words used in this specification and claims should not be restrictively interpreted as ordinary meanings or dictionary-based meanings, but should be interpreted as meanings and concepts conforming to the scope of the present disclosure on the basis of the principle that an inventor can properly define the concept of a term to describe his or her invention in the best ways.

Gripper

The present disclosure provides a gripper 100 that presses and fixes a secondary battery 10 including a pouch 12, which includes an accommodation part 12*a* in which an electrode assembly 11 is accommodated and a gas pocket part 12*b* extending from the accommodation part 12*a*, and an electrode lead 13 protruding the pouch 12.

The secondary battery 10 may be supported by a support 20. Here, the support 20 is a component that supports the secondary battery 10, and may have various configurations.

Figure 2:
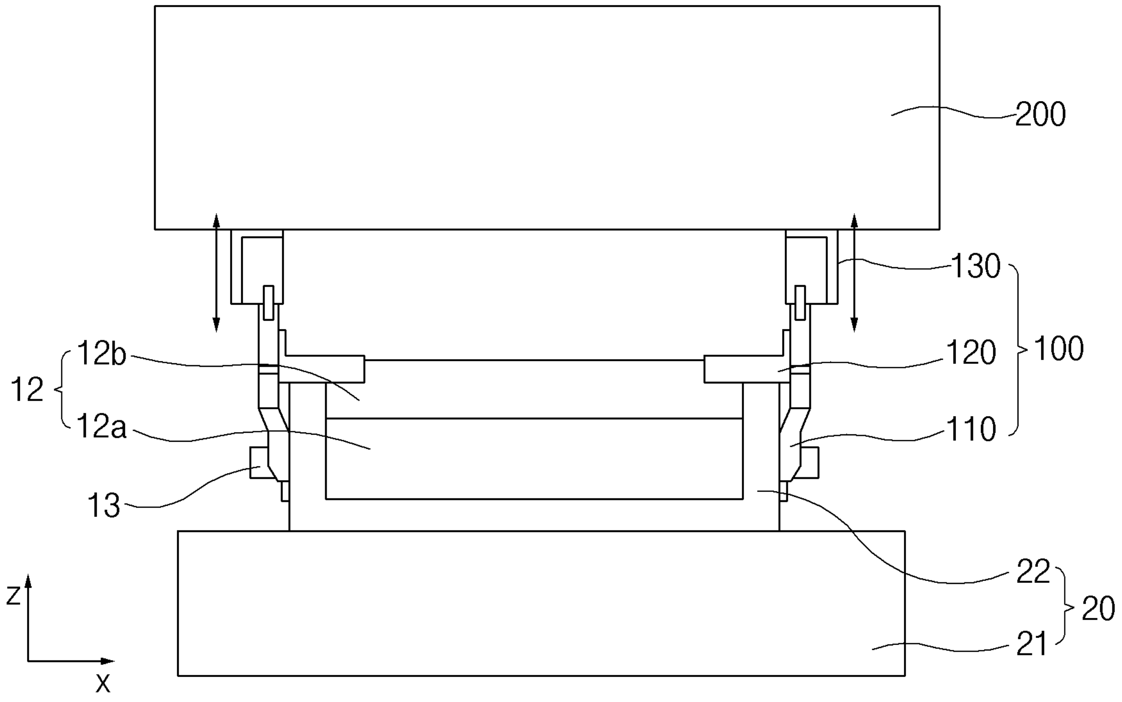
FIG. 2 is a front view illustrating a secondary battery manufacturing device including a gripper according to Embodiment 1 of the present invention when viewed from a front side.

Specifically, as illustrated in FIG. 2, the support 20 may include a horizontal support 21 that supports the secondary battery 10 at a lower side, and at least one vertical support 22 that perpendicularly extends upward from the horizontal support 21 to support the secondary battery 10 at a lateral side.

Here, the horizontal support 21 and the vertical support 22 may each have various shapes.

For example, the horizontal support 21 and the vertical support 22 may each have a flat plate shape or a block shape. Here, the vertical support 22 may have a ‘C’ shape so as fit and fix the accommodation part 12*a* of the secondary battery 10. The horizontal support 21 and the vertical support 22 may be provided as an integrated component, and may be provided as separate components.

The gripper 100 is a component that presses and fixes the secondary battery 10, and may have various configurations.

Specifically, the gripper 100 may press and fix the secondary battery 10, and then move so as to transfer the secondary battery 10 from one position to another position. Here, a moving direction of the gripper 100 may be set to various directions such as a vertical direction or a horizontal direction.

The gripper 100 may be provided in plurality. For example, the gripper 100 may be provided in a pair. In this case, as illustrated in FIG. 2, the grippers 100 may be disposed at positions corresponding to both ends, respectively, of the pouch 12, at which the electrode lead 13 is disposed.

Such a gripper 100 may have various structures. For example, the gripper 100 may include at least one electrode lead fixing part 110 that presses and fixes the electrode lead 13, and at least one gas pocket part fixing part 120 that presses and fixes the gas pocket part.

Here, the electrode lead fixing part 110 is a component that presses and fixes the electrode lead 13, and may have various configurations.

For example, the electrode lead fixing part 110 may grip and fix the electrode lead 13 by simultaneously pressing one surface of the electrode lead 13 protruding the pouch 12 and the other surface disposed in a direction opposite to the one surface.

Figure 3:
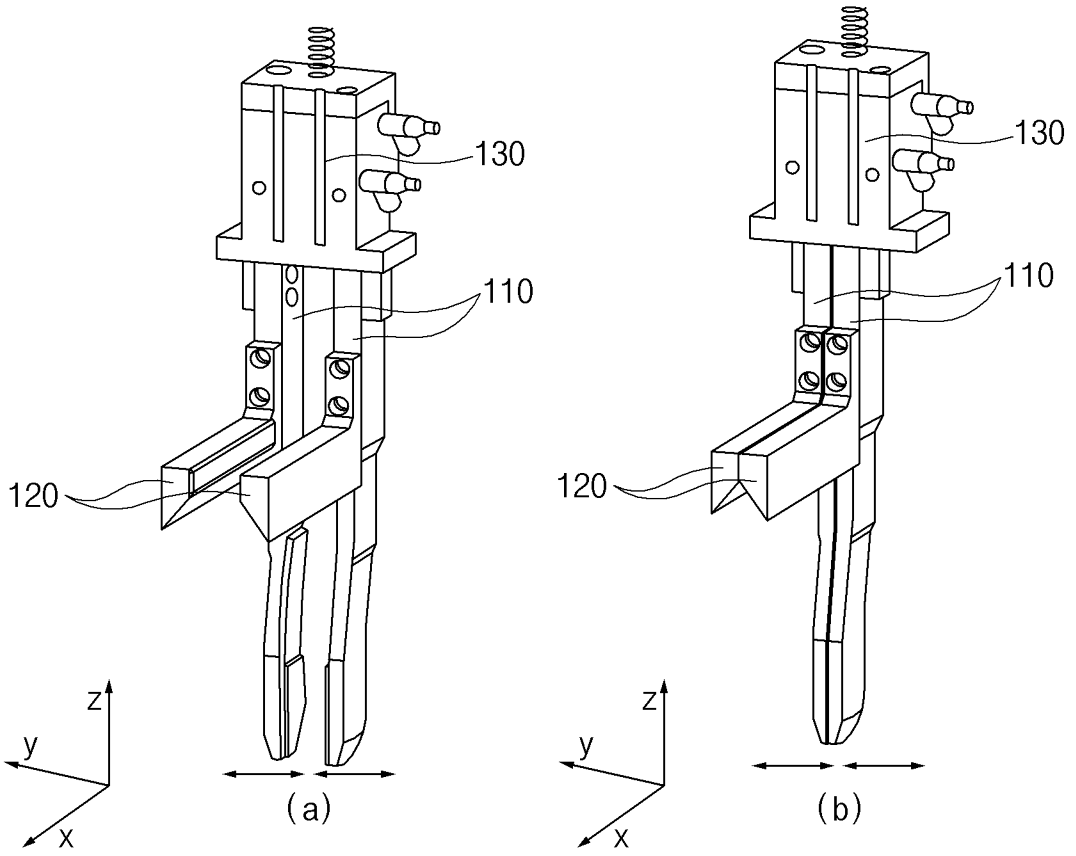
FIG. 3 is two perspective views illustrating the gripper of the secondary battery manufacturing device in FIG. 2 in more detail in two different states.

In this case, as illustrated in part (a) and part (b) of FIG. 3, the electrode lead fixing part 110 may be provided in a pair to face each other. Here, the electrode lead fixing parts 110 may be movably provided to adjust a spaced distance therebetween so as to grip the electrode lead 13.

In more detail, as illustrated in part (a) of FIG. 3, the pair of electrode lead fixing parts 110 may be spaced a predetermined distance from each other before pressing and fixing the electrode lead 13.

As illustrated in part (b) of FIG. 3, the pair of electrode lead fixing parts 110 may press and fix the electrode assembly 11 by moving in the horizontal direction (a y direction in FIG. 3) so that the spaced distance decreases. In this case, the pair of electrode lead fixing parts 110 may be spaced a distance corresponding to the width of the electrode lead 13 from each other. Here, the distance corresponding to the width of the electrode lead 13 may be a distance that is the same as or smaller than the width of the electrode lead 13.

The gripper 100 described above may further include a body part 130 so as to move the electrode lead fixing part 110. That is, the electrode lead fixing part 110 may be movably connected to the body part 130, and the body part 130 may include a driving device such as a linear motion (LM) guide that operates with the electrode lead fixing part 110 so as to move the electrode lead fixing part 110.

Such an electrode lead fixing part 110 may have various shapes. For example, the electrode lead fixing part 110 may have a bar shape extending in a longitudinal direction that is a height direction (a z direction in FIG. 1) of the secondary battery 10.

In the electrode lead fixing part 110, a pad made of a silicon material or the like, which may improve adhesion with the electrode lead 13, may be further provided in an area provided to face the electrode lead 13. Here, when the electrode lead fixing part 110 has the bar shape, the pad may be provided at an end of the bar shape.

The gas pocket part fixing part 120 is a component that presses and fixes the gas pocket part, and may have various configurations.

Specifically, the gas pocket part fixing part 120 may press and fix the gas pocket part **12*b* so that the gas pocket part 12*b* is disposed at a fixed position. Here, the fixed position may be understood as a position at which the gas pocket part 12*b* is aligned parallel to the accommodation part 12*a***.

That is, when the gas pocket part **12*b* is biased toward the front or rear of the pouch 12 to deviate from the fixed position, the gas pocket part fixing part 120 may realign the gas pocket part 12*b* at the fixed position. Here, the aligned gas pocket part 12*b* may maintain the alignment position due to the stiffness of an ultra-thin metal layer including a metal material (e.g., aluminum, etc.) constituting the pouch 12**.

Such a gas pocket part fixing part 120 may grip and fix the gas pocket part **12*b* by simultaneously pressing one surface of the gas pocket part 12*b*** and the other surface disposed in a direction opposite to the one surface.

In this case, as illustrated in part (a) and part (b) of FIG. 3, the gas pocket part fixing part 120 may be provided in a pair to face each other. In more detail, the gas pocket part fixing parts 120 may be movably provided to adjust a spaced distance therebetween so as to grip the gas pocket part fixing part 120.

In more detail, as illustrated in part (a) of FIG. 3, the pair of gas pocket part fixing parts 120 may be spaced a predetermined distance from each other before pressing and fixing the gas pocket part **12*b***.

As illustrated in part (b) of FIG. 3, the pair of gas pocket part fixing parts 120 may press and fix the gas pocket part **12*b* by moving in the horizontal direction (the y direction in FIG. 3) so that the spaced distance decreases. In this case, the pair of gas pocket part fixing parts 120 may be spaced a distance corresponding to the width of the gas pocket part 12*b* from each other. Here, the distance corresponding to the width of the gas pocket part 12*b* may be a distance that is the same as or smaller than the width of the gas pocket part 12*b***.

The gas pocket part fixing part 120 as described above may have various structures.

For example, the gas pocket part fixing part 120 may include a connection part 121 connected to the electrode lead fixing part 110, and a protrusion 122 protruding from the connection part 121 so as to face one surface of the gas pocket part **12*b***.

The gas pocket part fixing part 120 may further include a pad part 123 provided in an area facing the gas pocket part **12*b* to improve adhesion with the gas pocket part 12*b***.

Here, the connection part 121 is a component connected the electrode lead fixing part 110, and may have various configurations.

Specifically, as the connection part 121 is connected to the electrode lead fixing part 110, the connection part 121 may operate with movement of the electrode lead fixing part 110 so that the protrusion 122 to be described later is movable.

More specifically, as illustrated in part (a) and (b) of FIG. 3, the connection part 121 may be connected to the electrode lead fixing part 110 at one side of the electrode lead fixing part 110. In this case, the connection part 121 may be bolt-coupled to the electrode lead fixing part 110.

The protrusion 122 is a component protruding from the connection part 121 so as to face one surface of the gas pocket part **12*b*** and may have various configurations.

Figure 4:
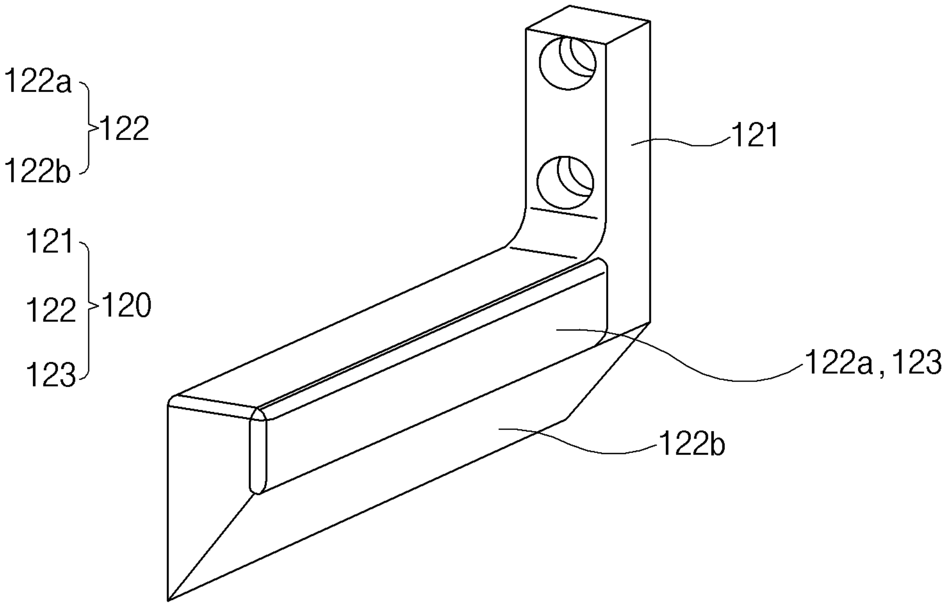
FIG. 4 is a perspective view illustrating a gas pocket part fixing part of the gripper of FIG. 3 in more detail.

Specifically, the protrusion 122 may protrude from the connection part 121 in a direction parallel to the gas pocket part **12*b* so as to face the one surface of the gas pocket part 12*b*. Here, as illustrated in FIG. 4, the protrusion 122 may protrude from the connection part 121 in various directions, and, for example, may protrude perpendicularly from the connection part 121**.

In more detail, the protrusion 122 may include a pressing part **122*a* that is provided to face the gas pocket part 12*b* and presses the gas pocket part 12*b*, and an inclined part 122*b* extending from the pressing part 122*a***.

Here, the inclined part **122*a* is a component that is provided to face the gas pocket part 12*b* and presses the gas pocket part 12*b***, and may have various configurations.

Specifically, as the pressing part **122*a* has one surface provided to face the gas pocket part 12*b*, the one surface may press the gas pocket part 12*b* when the gas pocket part fixing part 120** moves in the horizontal direction.

As illustrated in FIG. 4, the pad part 123, which may improve the adhesion between the pressing part **122*a* and the gas pocket part 12*b*, may be provided between the pressing part 122*a* and the gas pocket part 12*b*, i.e., between one surface of the pressing part 122*a* facing the gas pocket part 12*b* and the gas pocket part 12*b***.

FIG. 4 illustrates that reference symbols **122*a* and 123 indicate the same position. However, it is noted that the pad part 123 is a component additionally provided on one surface of the pressing part 122*a*, and thus the pad part 123 and the pressing part 122*a*** are concepts distinguished from each other.

The pad part 123 may include various materials. For example, the pad part 123 may include a material such as silicon, urethane, and rubber. The pad part 123 may adhere to be fixed to the pressing part **122*a*** in various methods or may be provided in various methods such as spray coating.

The inclined part **122*b* is a component extending from the pressing part 122*a*** and may have various configurations.

Specifically, the inclined part **122*b* is a component that allows the gas pocket part 12*b* to be smoothly inserted between the pair of gas pocket part fixing parts 120 even when the gas pocket part 12_b_ is biased toward the front or rear of the secondary battery 10. The inclined part 122_b_ may extend to be inclined from the pressing part 122**_a_.

In this case, as the gas pocket part 12_b_ is guided in an inclined direction of the inclined surface, the gas pocket part 12_b_ may be disposed to face the pressing part 122_a_ described above. For this, the inclined part 122_b_ may be inclined in a direction that is away from the gas pocket part, as being far away from the pressing part 122_a_.

In one example, when the gripper 100 moves in the vertical direction (a z direction in FIG. 2) with respect to the secondary battery 10, the inclined part 122_b_ may be disposed at a lower portion of the pressing part 122_a_ and inclined toward a lower side in the direction that is away from the gas pocket part 12_b_.

In another example, when the gripper 100 moves in the horizontal direction (an x direction in FIG. 2) with respect to the secondary battery 10, the inclined part 122_b_ may be disposed at one lateral portion of the pressing part 122_a_ and inclined toward one side far away from the pressing part 122_a_ in the direction that is away from the gas pocket part 12_b_.

Secondary Battery Transfer Device

The present disclosure provides a secondary battery transfer device that transfers a secondary battery 10 including a pouch 12, which includes an accommodation part 12_a_ in which an electrode assembly 11 is accommodated and a gas pocket part 12_b_ extending from the accommodation part 12_a_, and an electrode lead 13 protruding from the pouch 12, the secondary battery transfer device including a body part and a pair of grippers 100 that are movably connected to the body part and press and fix the secondary battery 10.

Here, a main body part 200 is a component connected to the grippers 100 and may include a driving device such as a linear motion (LM) guide that operates with the grippers 100 so that the grippers 100 are movable in at least one of the vertical direction or the horizontal direction.

The grippers 100 each is a component that presses and fixes the secondary battery 10, and may have various configurations.

In more detail, the gripper 100 is a component that includes at least one electrode lead fixing part 110 that a presses and fixes the electrode lead 13, and at least one gas pocket part fixing part 120 that presses and fixes the gas pocket part. The gripper 100 may have various configurations.

Here, the detailed description of the electrode lead fixing part 110 and the gas pocket part fixing part 120 may be replaced with the contents described above.

Although the present invention has been described with reference to the limited embodiments and drawings, the present invention is not limited thereto and may be variously implemented by those of ordinary skill in the art to which the present invention pertains, within the technical idea of the present invention and an equivalent of the appended claims.

DESCRIPTION OF THE SYMBOLS

10: Secondary battery
11: Electrode assembly
12: Pouch
12_a_: Accommodation part
12_b_: Gas pocket part
13: Electrode lead
20: Support
21: Horizontal support
22: Vertical support
100: Gripper
110: Electrode lead fixing part
120: Gas pocket part fixing part
121: Connection part
122: Protrusion
122_a_: Pressing part
122_b_: Inclined part
123: Pad part
130: Body part
200: Main body part

The invention claimed is:

1. A gripper configured to securely grasp a secondary battery comprising a pouch having an electrode assembly disposed in an accommodation part, a gas pocket part extending from the accommodation part, and an electrode lead protruding from the pouch, the gripper comprising:
an electrode lead fixing part configured to grasp and hold the electrode lead; and
gas pocket fixing part configured to grasp and hold the gas pocket part.

2. The gripper of claim 1, further comprising a pair of electrode lead fixing parts configured to movably adjust a distance between the pair of electrode lead fixing parts.

3. The gripper of claim 1, wherein the gripper includes a pair of gas pocket fixing parts configured to movably adjust a distance between the pair of gas pocket fixing.

4. The gripper of claim 1, wherein the gas pocket fixing part comprises:
a connection part connected to the electrode lead fixing part; and
a protrusion protruding from the connection part so as to face one surface of the gas pocket part.

5. The gripper of claim 4, wherein the protrusion protrudes perpendicularly from the connection part.

6. The gripper of claim 5, wherein the protrusion comprises a pressing part positioned to face the gas pocket part so as to press the gas pocket part, and an inclined part extending from the pressing part,
wherein the inclined part is angled away from the gas pocket part and the pressing part.

7. The gripper of claim 6, wherein the inclined part is disposed at a lower portion of the pressing part and angled toward a lower side of the protrusion away from the gas pocket part.

8. The gripper of claim 1, wherein the gas pocket fixing part further comprises a pad part positioned in an area facing the gas pocket part and configured to improve grip against the gas pocket part.

9. The gripper of claim 8, wherein the pad part is made of silicon.

10. The gripper of claim 6, wherein the gas pocket fixing part further comprises a pad part positioned between the pressing part and the gas pocket part and configured to improve grip against the gas pocket part.

11. A secondary battery transfer device configured to transfer a secondary battery including a pouch having an electrode assembly disposed in an accommodation part, a gas pocket part extending from the accommodation part, and an electrode lead protruding from the pouch, the secondary battery transfer device comprising:
a body part; and
a pair of grippers movably connected to the body part, each of the grippers being configured to securely grasp the secondary battery,
wherein each of the grippers comprises:
at least one electrode lead fixing part configured to grasp and hold the electrode lead, and at least one gas pocket fixing part configured to grasp and hold the gas pocket part.

* * * * *